United States Patent
Miyashita et al.

(10) Patent No.: US 7,607,356 B2
(45) Date of Patent: Oct. 27, 2009

(54) PIRANI VACUUM GAUGE

(75) Inventors: Takeshi Miyashita, Chigasaki (JP); Naoki Takahashi, Chigasaki (JP)

(73) Assignee: ULVAC, Inc., Kanagawa (JP)

( * ) Notice: Subject to any disclaimer, the term of this patent is extended or adjusted under 35 U.S.C. 154(b) by 93 days.

(21) Appl. No.: 11/630,868

(22) PCT Filed: Nov. 7, 2005

(86) PCT No.: PCT/JP2005/020351
§ 371 (c)(1),
(2), (4) Date: Dec. 22, 2006

(87) PCT Pub. No.: WO2006/057148
PCT Pub. Date: Jun. 1, 2006

(65) Prior Publication Data
US 2008/0115585 A1    May 22, 2008

(30) Foreign Application Priority Data
Nov. 24, 2004  (JP) .............................. 2004-339239

(51) Int. Cl.
*G01L 21/12* (2006.01)
(52) U.S. Cl. .............................. 73/755; 73/753; 73/754
(58) Field of Classification Search ........... 73/700–756; 361/283.1–283.4
See application file for complete search history.

(56) References Cited

U.S. PATENT DOCUMENTS 3,411,362 A * 11/1968 Arasim, Jr. ................... 73/734
4,995,264 A *  2/1991 Stocker et al. ................ 73/702
6,185,351 B1 *  2/2001 Daneshvar et al. .......... 385/114

FOREIGN PATENT DOCUMENTS

JP            7120339      * 10/1993

* cited by examiner

*Primary Examiner*—Andre J Allen
*Assistant Examiner*—Jermaine Jenkins
(74) *Attorney, Agent, or Firm*—Carothers & Carothers (57) ABSTRACT

A Pirani vacuum gauge in which dependency of temperature of a filament on variation of gas pressure is raised and the gas pressure can be measured with high accuracy. The Pirani vacuum gauge includes a cylindrical body 2 in which the interior communicates with a space to be measured for pressure; a filament 1 enclosed in the cylindrical body 2; and a pipe 7 surrounding the filament 1 in the cylindrical body, the least distance between the facing inner walls of the pipe being equal to less than 6 mm and the pipe 7 covering more than 80% of the length of the filament 1.

10 Claims, 7 Drawing Sheets

PIRANI VACUUM GAUGE

TECHNICAL FIELD

This invention relates to a Pirani vacuum gauge for measuring gas pressure and more particularly to a Pirani vacuum gauge in which a detector arranged in a space to be measured for pressure is improved.

BACKGROUND OF THE TECHNIQUE

In a Pirani vacuum gauge, a current is flowed through a filament to heat the filament. An amount of heat absorbed by the surrounding gas from the filament depends on the gas pressure, and therefore the gas pressure is measured by utilizing this dependency. The filament may be in the form of a coil, for example, as shown in the patent literature 1.

Patent Document 1: JP7-120339A

Figure 7:
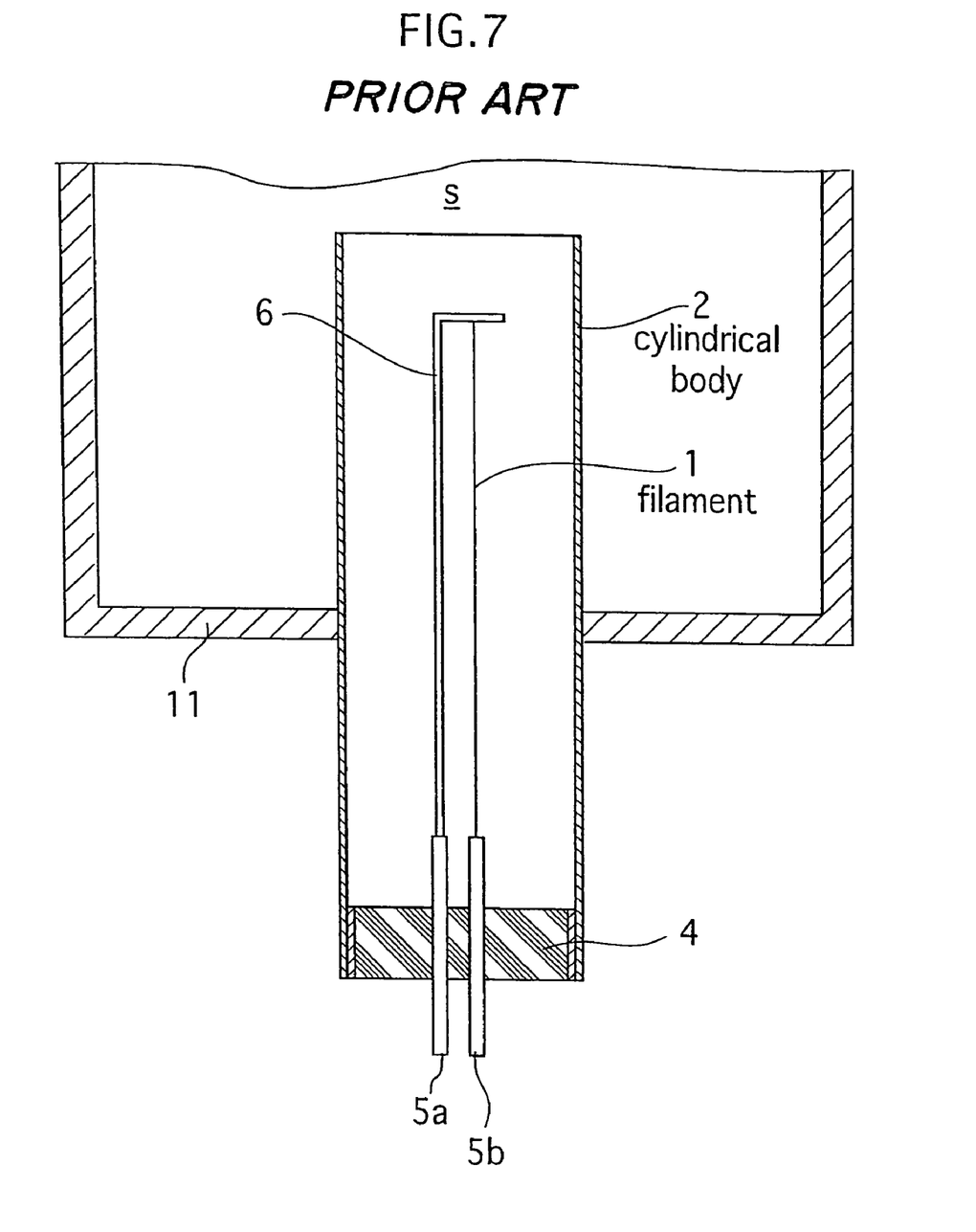
FIG. 7 is a schematic view of the prior art Pirani vacuum gauge.

FIG. 7 shows a schematic construction of the prior art Pirani vacuum gauge. The filament 1 is included in a cylindrical body 2, which is open at an upper end and is closed air-tight at a lower end with an insulating member 4. The opening is communicating with the space s to be measured for pressure and the interior of the cylindrical body 2 also is communicating with the space s, which is the interior of a vacuum tank 11. The filament 1 contacts with the space s to be measured for pressure. The cylindrical body 2 functions as the division between the space s and the atmosphere outside of the vacuum tank 11.

The lower end of the filament 1 is connected to the conductive terminal 5b, which is inserted through the insulating member 4 into the cylindrical body 2. The top end of the filament 1 is connected to a top end of a conductive filament support 6 and the lower end of the conductive filament support 6 is connected to the conductive terminal 5a, which is inserted through the insulating member 4 into the cylindrical body 2. Accordingly, the filament 1 is electrically connected to the conductive terminals 5a and 5b, which are connected to a not-shown control circuit under the atmosphere outside of the cylindrical body 2. Electric power is supplied to the filament 1 through the conductive terminals 5a and 5b.

The filament 1 is assembled into a part of a not-shown bridge circuit and resistance change with temperature change of the filament 1 is detected by the bridge circuit, in the marketed Pirani vacuum gauge. There are operation modes of the constant current or voltage type and constant temperature type. In the Pirani vacuum gauge of the constant voltage or current type, a constant current or voltage is supplied to the bridge circuit. The resistance change of the filament 1 with temperature change thereof due to the gas pressure change is detected as the unbalanced voltage of the bridge circuit. In the Pirani vacuum gauge of the constant temperature type, with the detection of the unbalanced voltage, a current is so fed back to the bridge circuit that the resistance or temperature of the filament 1 is maintained at constant and the balance of the bridge circuit is maintained. The electric power is so controlled automatically that the amount of the heat absorbed by the gas is compensated to maintain the temperature of the filament 1 at constant. Accordingly, the gas pressure is detected with the supplied electric power. The usual measurement accuracy is about ±30% under the pressure range (less than $3 \times 10$ Pa) usually measured by the Pirani vacuum gauge.

DISCLOSURE OF THE INVENTION

Problem to be Solved by the Invention

In the prior Pirani vacuum gauge, there is large difference between the measured pressures in the vertical position or perpendicular position of the filament 1 and in the horizontal or vertical to the perpendicular line position of the filament 1 within the range between about $10^4$ Pa and atmosphere. Even when the same gas pressure is measured in the horizontal and vertical positions, there is a difference of more than 50% in the positions. In the horizontal position, the filament receives more influence of convection and therefore of heat transfer in the cylindrical body. Accordingly, a larger amount of heat is absorbed from the filament. For example, in the Pirani vacuum gauge, more electric power is more supplied. As a result, the measured pressure is apt to be higher than the actual pressure.

The temperature of the gas in the cylindrical body 2 is substantially equal to the cylindrical body 2. The atmosphere temperature outside of the vacuum tank 11 has some influence on the cylindrical body 2. Accordingly, the temperature of the gas in the cylindrical body 2 changes with the atmosphere. The temperature of the filament 1 depends on the surrounding temperature and the gas pressure. The temperature of the filament 1 also depends on the difference between the temperature of the filament 1 and the gas temperature. Thus, the measurement accuracy is deteriorated.

This invention has been made in consideration of the above problem. The object of the invention is to provide a Pirani vacuum gauge which has high dependency with gas pressure change and can therefore measure gas pressure with high accuracy.

SUMMARY OF THE INVENTION

This invention employs the following arrangements for solving the above problem. A Pirani vacuum gauge of this invention comprises: a cylindrical body communicating with a space to be measured for pressure; a filament included in the cylindrical body; and a pipe surrounding the filament in the cylindrical body in which the least distance between the inside walls facing to each other is less than 6 mm and which covers more than 80% of the length of the filament.

The space surrounding the filament is limited by the pipe. Thus, a difference is difficult to occur between the horizontal position and the vertical position due to the convection and thermal transmission. The variation of the measured pressures due to the difference of the positions of the filament 1 can be reduced to improve the measurement accuracy. It is difficult to influence the filament 1 with changes in the cylindrical body 2 because of the pipe. Thus, the variation of the temperature of the filament 1 due to the change of the temperature of the gas can be reduced. Also by reason of that fact, the measurement accuracy can be improved.

A temperature sensor is attached to the pipe. The pressure indicating value is compensated with the output of the temperature sensor. Thus, the influence of the variation of the gas temperature can be reduced to improve the measurement accuracy. In this case, the response of the pressure indicating value for the pressure change can be improved particularly under a pressure of over $10^4$ Pa.

EFFECT OF THE INVENTION

The influence of the factors such as the difference of the positions and the variation of the temperature of the space surrounding the filament, except the variation of the gas pressure of the gas to be measured, can be reduced. In this case, the response of the pressure indicating values on the variation of the gas pressure can be improved. The dependency of the filament temperature on the gas pressure is increased and so the gas pressure can be accurately measured.

EXPLANATIONS OF LETTERS OR NUMERALS 1 filament
2 cylindrical body
4 insulating member
6 conductive filament support
7 pipe
8 pipe support
9 temperature sensor
11 vacuum tank
s space to be measured on pressure

BEST EMBODIMENT OF INVENTION

Next, detailed embodiments of this invention will be described with reference to the drawings. Of course, this invention is not limited to the embodiments, but various modifications will be possible on the basis of the technical concept of this invention.

First Embodiment

Figure 1:
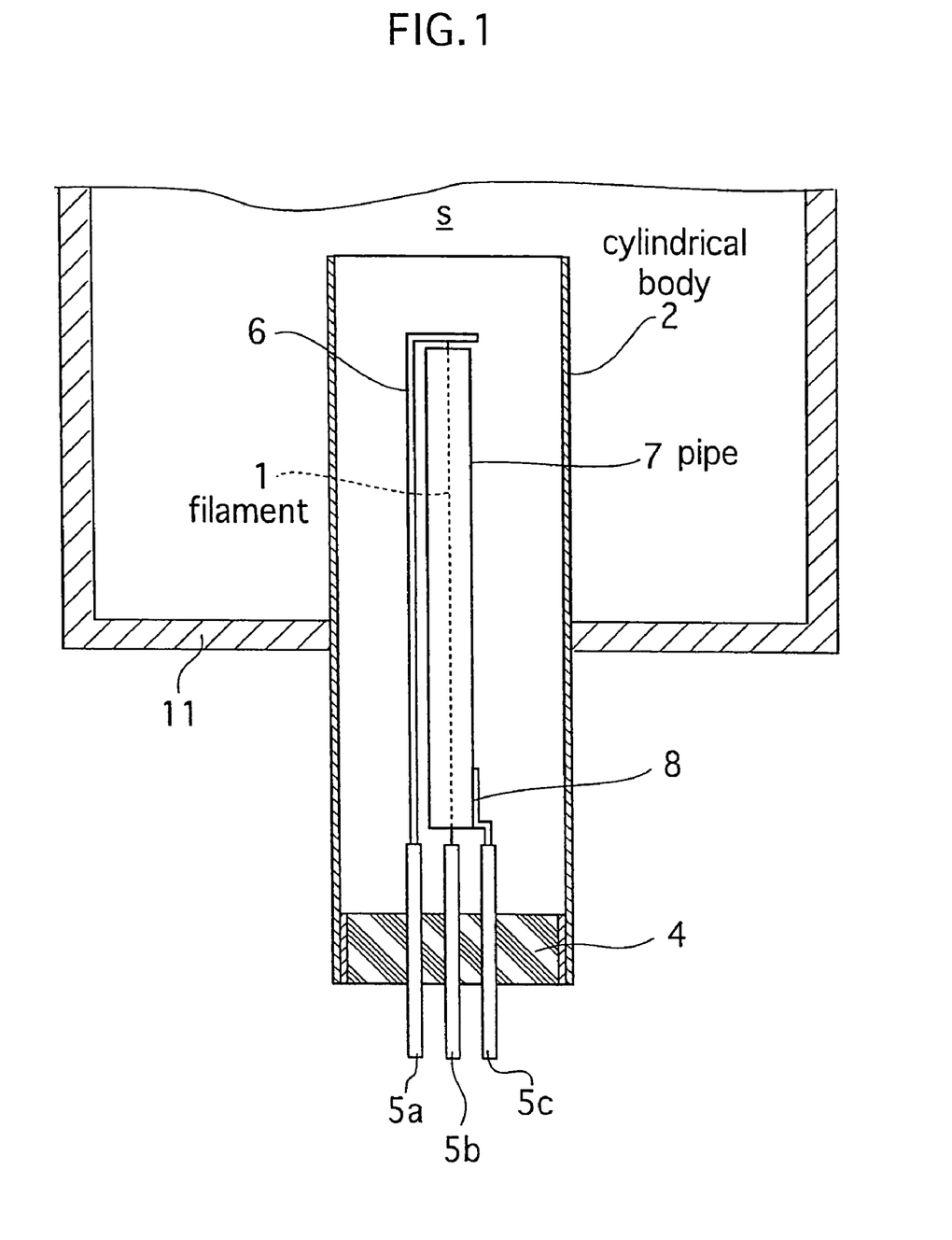
FIG. 1 is a schematic view of a Pirani vacuum gauge according to a first embodiment of this invention.

FIG. 1 shows a Pirani vacuum gauge according to a first embodiment of this invention. The filament 1 is included in the cylindrical body 2. The filament 1 is made of metal wire such as platina wire. The cylindrical body 2 is open at an upper end and is closed air tight with the insulating member 4, at a lower end. The filament 1 is not limited to the shape of a line, but may be in the shape of a coil. The filament 1 is elongated along the central axis of the cylindrical body 2 or near the central axis.

The opening end of the cylindrical body 2 communicates with the space s in the interior of the vacuum tank 11. The filament 1 contacts with the gas in the space s. The cylindrical body 2 functions as the division between the space s and the atmosphere outside of vacuum tank 11.

The lower end of the filament 1 is connected to a conductive terminal 5b, which is inserted through the insulating member 4 into the cylindrical body 2. The top end of the filament 1 is connected to a top end of a conductive filament support 6. The lower end of the conductive filament support 6 is connected to the conductive terminal 5a which is inserted air-tight through the insulating member 4 into the cylindrical body 2. Accordingly, the end of the filament 1 is electrically connected to the conductive terminals 5a and 5b, which are connected to a not-shown control circuit arranged under the atmosphere exterior of the vacuum tank 11. Electric power is supplied to the filament 1 through the conductive terminals 5a and 5b.

A pipe 7 surrounds the filament 1. The latter is inserted into the former along the central axis. The pipe 7 is open in both ends, and it does not contact with the filament 1. The interior of the pipe 1 communicates with the space s to be measured for pressure and the interior of the cylindrical body 2 through both of the open ends thereof.

The pipe 7 is supported at the lower end by a pipe support 8, so the filament 1 and the cylindrical body 2 are concentrically arranged. The pipe support 8 is fixed to the conductive terminal 5c which is inserted air-tight through the insulating member 4 into the cylindrical body 2. The filament support 8 does not make contact with the filament support 6.

The pipe 7 is cylindrical and its inner diameter is less than 6 mm. The pipe 7 covers more than 80% of the length of the filament 1. To prevent the interior of the pipe 7 becoming full of the heated gas and the temperature of the gas being raised in the interior of the pipe 7 to thereby have some influence on the temperature change of the filament 1, the pipe 7 is made preferably of high thermal conductive material such as metal.

The filament 1 is assembled into a part of a not-shown bridge circuit and the resistance change with the temperature change of the filament 1 is detected by the bridge circuit. In the Pirani vacuum gauge of the constant temperature type, with the detection of the unbalanced voltage, a current is so fed back to the bridge circuit that the resistance or temperature of the filament 1 is maintained at constant and the balance of the bridge circuit is maintained. The electric power is so controlled automatically that the amount of the heat absorbed by the gas is compensated to maintain the temperature of the filament 1 at constant. Accordingly the gas pressure is detected with the supplied electric power.

The Pirani vacuum gauge manufactured according to the first embodiment was measured on different performances.

The filament 1 was made of platinum, 25 μm in diameter and 56 mm in length. The pipe 7 was cylindrical and made of stainless, 60 μm in thickness. The inner diameter and the length were varied. The cylindrical body 2, the conductive filament support 6 and the support 8 were made of stainless.

Figure 4:
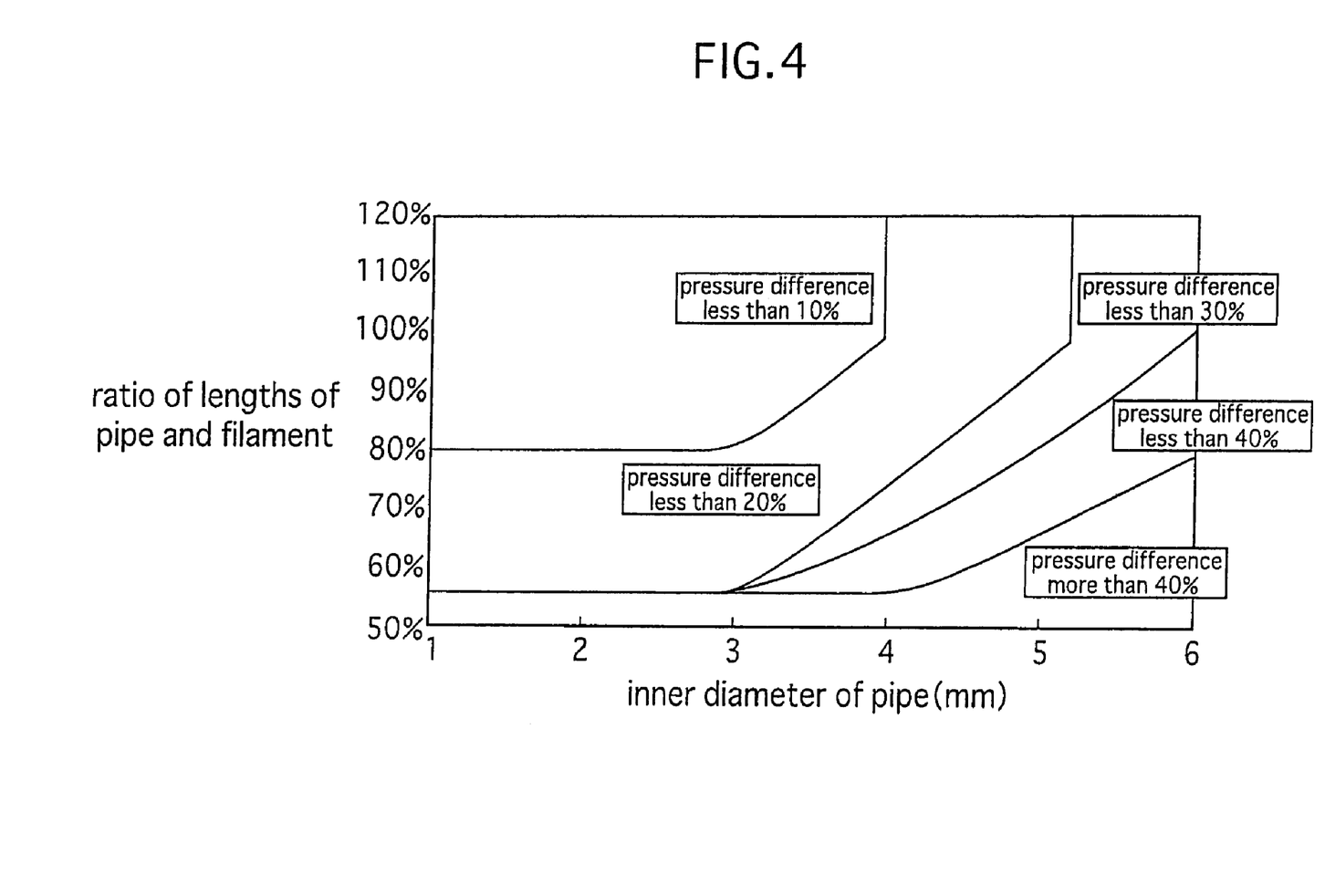
FIG. 4 is a graph showing the relationship among the measured pressure difference in the horizontal and vertical positions, and the inner diameter of the pipe and the ratio of the length of the pipe/the length of the filament.

FIG. 4 is a graph showing the relationships among the inner diameter of the pipe 7, the ratio of the length of the pipe 7/the length of the filament 1 and the differences of the pressure indicating values in the horizontal position and the vertical position under the measured gas (nitrogen) pressure of $1 \times 10^5$ Pa.

As is clear from FIG. 4, the pressure difference of the pressure indicating values in the horizontal and vertical positions were under 40% at the internal diameter of less than 6 mm and the ratio of the length of the pipe/the length of the filament over 80% or the coverage of the pipe to the filament 1 over 80%. In the prior Pirani vacuum gauge. it was over 50% and so the pressure difference was much reduced according to this embodiment.

Further, the pressure difference of the pressure indicating values in the horizontal and vertical positions was under 40% at the internal diameter of less than 5 mm and the ratio of the length of the pipe/the length of the filament was over 80% or the coverage of the pipe to the filament 1 was over 80%.

Figure 3:
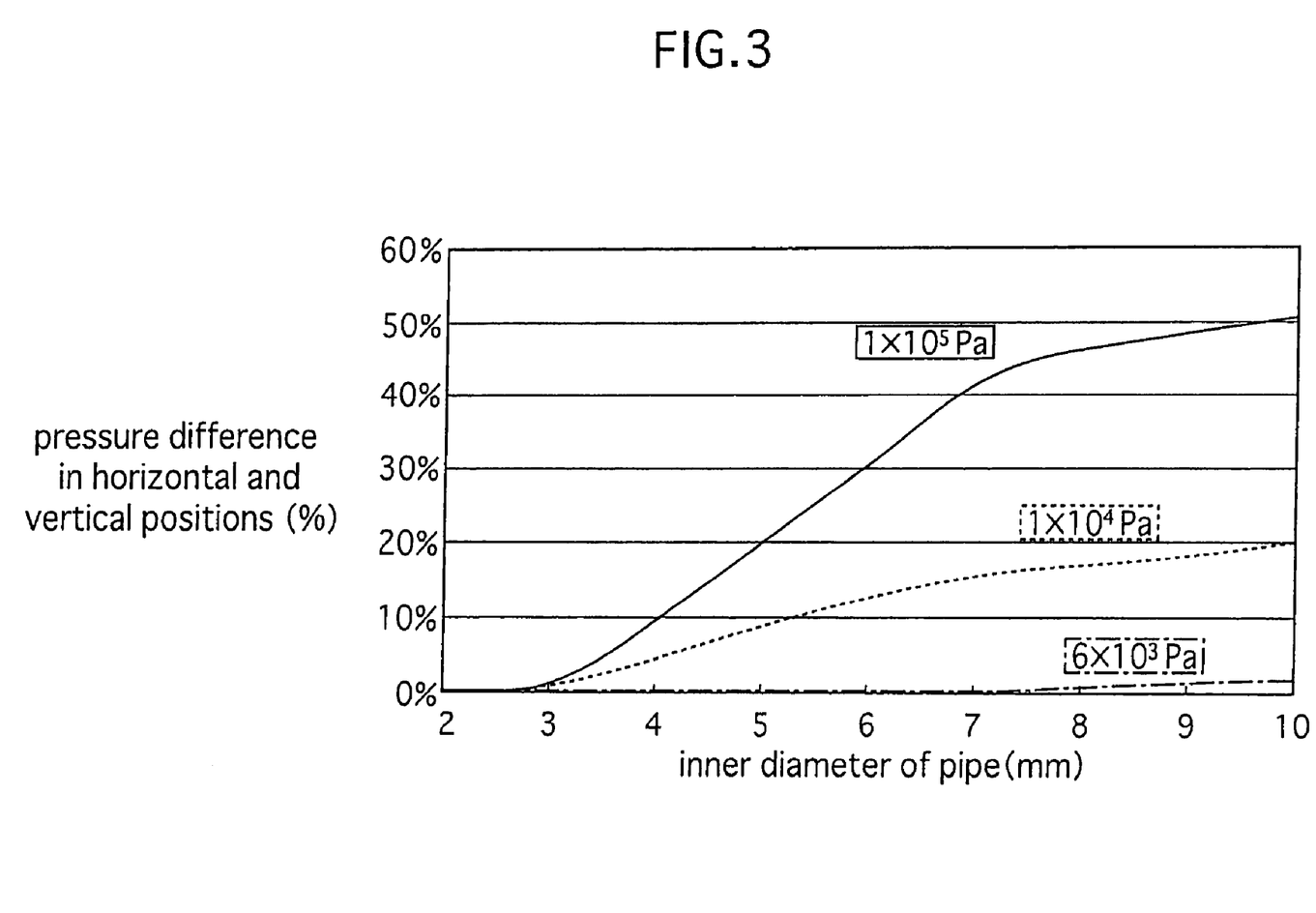
FIG. 3 is a graph showing the relationship between the measured pressure difference in the horizontal and vertical positions, and the inner diameter of the pipe.

FIG. 3 shows the relationship between the inner diameter of the pipe 7 and the pressure differences of the pressure indicating values in the horizontal and vertical positions at the same length (56 mm) of the pipe and the filament 1 respectively under the pressures of the gas (nitrogen), $6 \times 10^3$ Pa, $1 \times 10^4$ Pa, $1 \times 10^5$ Pa.

As understood from the result of FIG. 3, under less than the pressure of $1 \times 10^5$ Pa, furthermore the pressure difference of the pressure indicating values in the horizontal and vertical positions were reduced under 30% at the internal diameter of the pipe 7 of less than 6 mm and the ratio of the length of the pipe/the length of more than 80% (100% in FIG. 3), at the internal diameter of less than 4 mm under less than the pressure of $1 \times 10^5$ Pa. Furthermore the pressure difference of the pressure indicating values in the horizontal and vertical positions was reduced to under 10%. Also, at the internal diameter of less than 3 mm, under a pressure less than $1 \times 10^5$ Pa, it was reduced under a few %.

Figure 5:
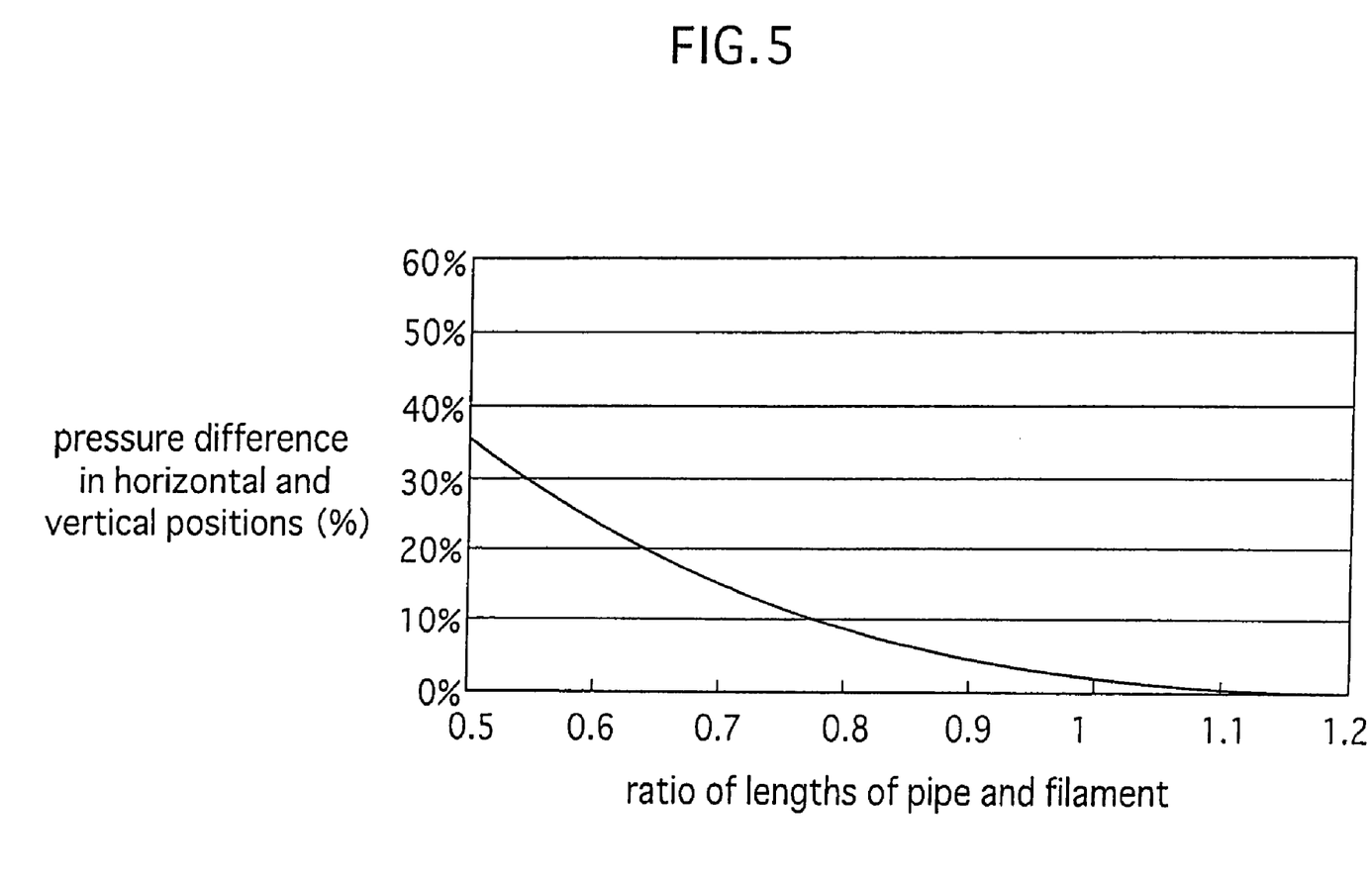
FIG. 5 is a graph showing the relationship between the measured pressure difference in the horizontal and vertical positions, and the ratio of the length of the pipe/the length of the filament.

FIG. 5 shows the relationship, between the pressure difference of the pressure indicating values in the horizontal and vertical positions and the ratio of the length of the pipe/the length of the filament 1, obtained from the data of FIG. 4. The diameter of the pipe 7 was equal to 3 mm. As is clear from FIG. 5, when the pipe 7 covers more than 80% of the length of the filament 1, the pressure difference of the pressure indicating values in the horizontal and vertical positions was reduced to less than 10%. That is very superior.

In the prior art, the pressure difference of the pressure indicating values in the horizontal and vertical positions was large under the relatively high pressure of near atmosphere ($1 \times 10^5$ Pa). However, according to this embodiment, the pressure difference of the pressure indicating values in the horizontal and vertical positions were reduced under the above pressure. The gas pressure is accurately measured. In this embodiment, the pressure range in which the pressure can be accurately measured is much wider in contrast to the prior art.

The material of the pipe 7 is not limited to stainless. However, adiabatic material should be avoided for the pipe 7, since the interior of the pipe 7 is full of the heated gas to change the temperature of the filament 1. It is preferable that a thermal conductive material is used for the pipe 7.

The thickness of the pipe 7 is not limited to 60 μm, but it may be designed in accordance with the thermal conductivity of the material to be used for the pipe 7 so as to maintain good thermal conductivity. For example, the thermal conductivity of an aluminum alloy is higher than that of stainless. Accordingly, the thickness of stainless may be larger. Instead Mo, W, Al, Cu and Ni may be used for the pipe 7, as thermal conductive material.

The shape of the cross section of the pipe 7 is not limited to a circle, but it may be a triangle, square or polygonal, or it may be oblong. In the latter cases, the inner diameter should be substituted with the least distance between the facing inner walls of the pipe.

Second Embodiment

Next, the second embodiment of this invention will be described. Those elements which correspond with the parts in the first embodiment, will be denoted by the same reference numerals, the detailed description of which will be omitted.

In the prior art in which the pipe 7 is not used, the cylindrical body 2 is heated by the heat from the filament 1 and so the temperature of the cylindrical body 2 is varied and that of the interior of the cylindrical body 2 varies. Accordingly the temperature of the filament 1 is easy to change. There is the problem that the response of the pressure indicating value to the change of the pressure is low.

Figure 2:
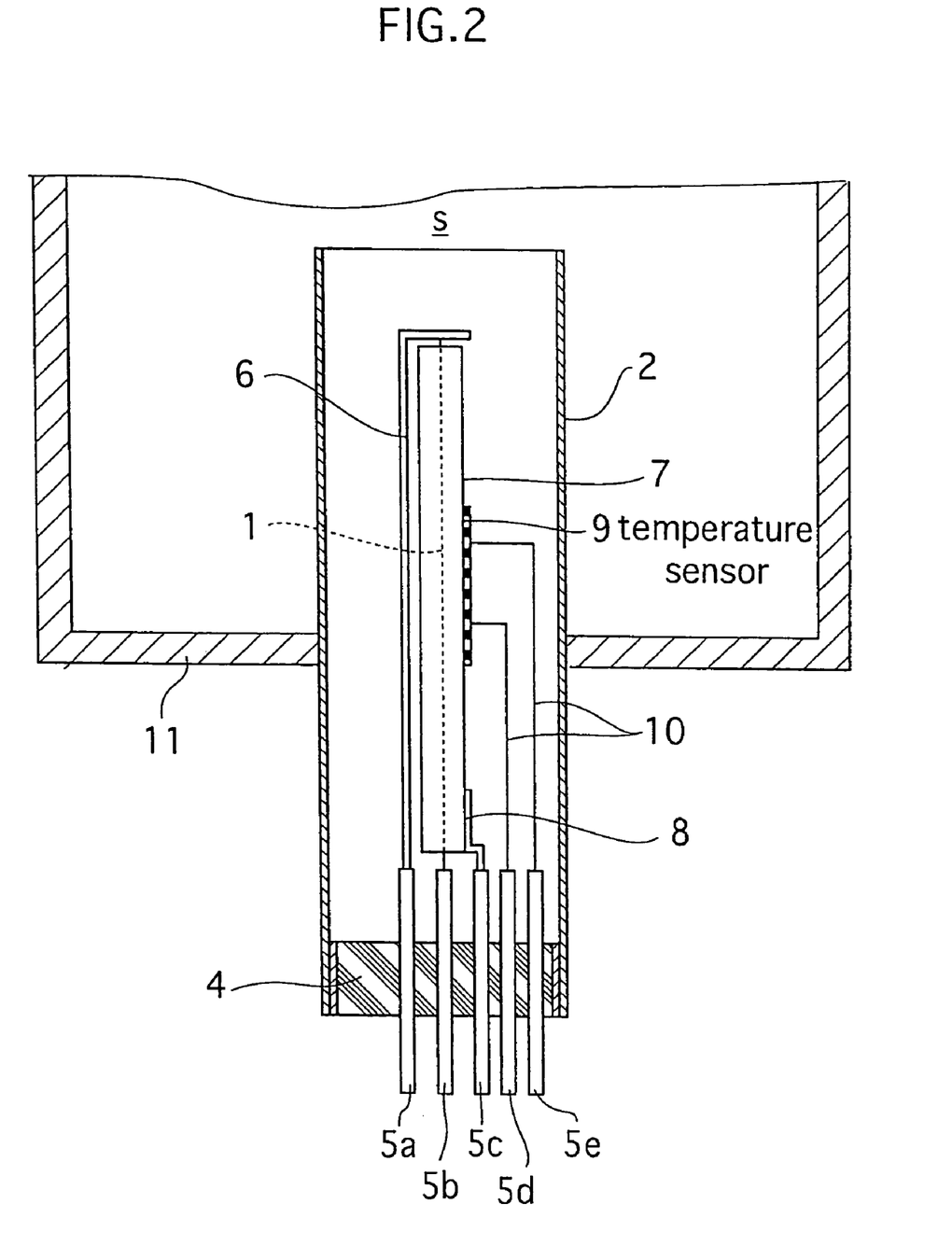
FIG. 2 is a schematic view of a Pirani vacuum gauge according to a second embodiment of this invention.

Accordingly, in the second embodiment, as shown in FIG. 2, a temperature sensor 9 is attached on the outside wall of the pipe 7. The pressure indicating value is corrected with the output or detected temperature. The temperature sensor 9 is connected to a not-shown temperature correcting circuit through wires 10 to the conductive terminals 5d and 5e. A temperature correcting circuit generates a pressure indicating value which is corrected on the basis of the output of the temperature correcting circuit. Thereby, the variation of the temperature of the filament 1 due to change of the gas temperature in the interior of the pipe 7, is cancelled.

The Pirani vacuum gauge manufactured according to the second embodiment was measured on response. A platina measurement resistor was used as the temperature sensor 9. The inner diameter is equal to 3 mm. The ratio of the length of the pipe/the length of the filament 1 is equal to 100%. The other conditions are the same as in the first embodiment. A diode may be used as the temperature sensor 9.

Figure 6:
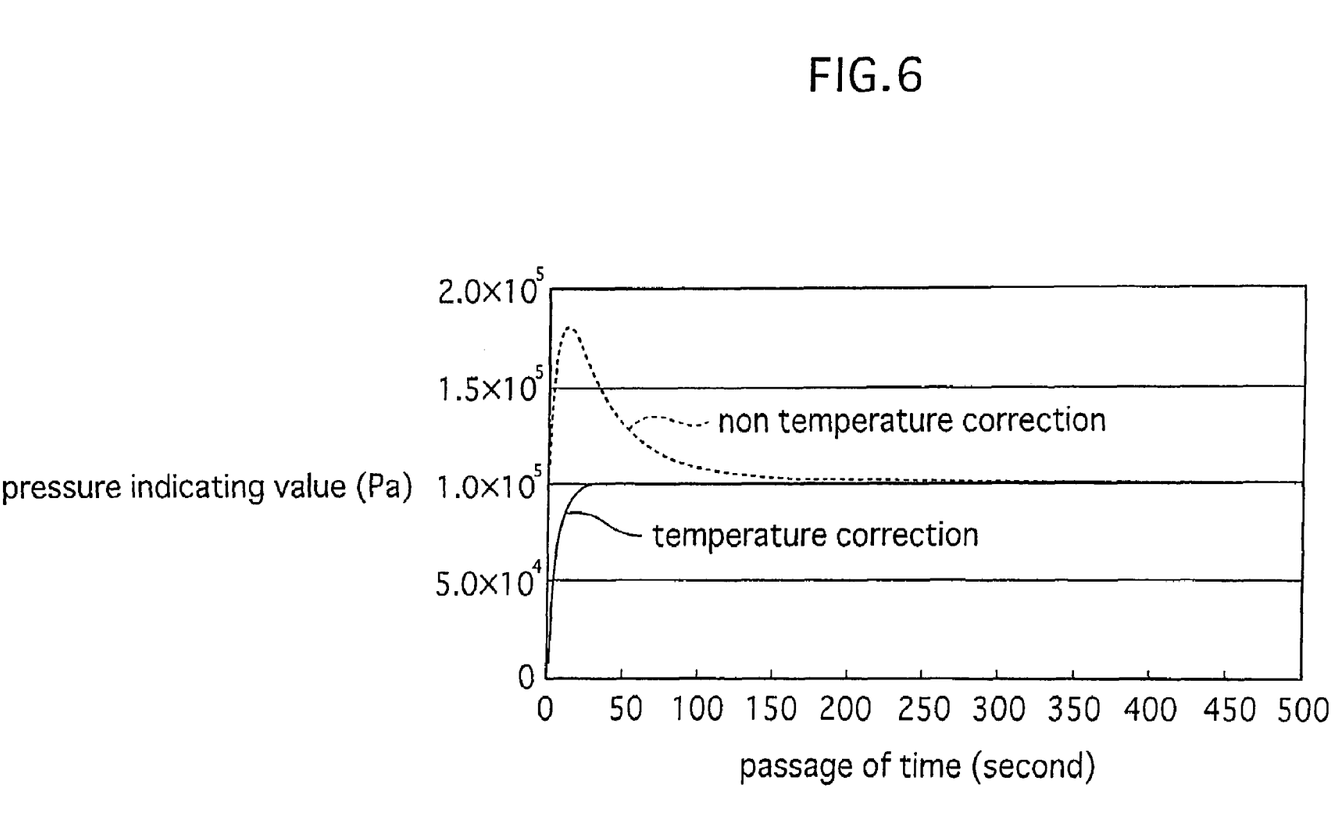
FIG. 6 is a graph showing the change of the pressure indicating values from the vacuum pressure to the atmosphere with the passage of time.

FIG. 6 shows the pressure indicating values with passage of time, in the case wherein gas (nitrogen) is introduced into the space s from a pressure of less than 1 Pa to a pressure of atmosphere. The solid line shows the corrected pressure indicating values with the temperature sensor 9 and the dashed line shows the no-corrected pressure indicating value. When the temperature correction is effected, the pressure indicating values becomes stable after about 30 seconds. When the temperature correction is not effected, they become stable after longer than about 200 seconds. The response was improved with the temperature sensor 9.

In a semiconductor process, opening and closing of a valve for introducing process gas into a processing chamber is controlled, monitoring the pressure indicating values. The high response suppresses the lapse of the opening and closing control of the valve in the variation of the gas pressure in the processing chamber.

The invention claimed is:

1. A Pirani vacuum gauge comprising:
   a cylindrical body in which the interior communicates with a space to be measured for pressure;
   a filament included in said cylindrical,
   a pipe surrounding said filament in said cylindrical body whereby said filament passes through a central axis of said pipe, the least distance between facing inner walls of said pipe being equal to less than 4 mm and said pipe covering more than 80% of the length of said filament; and a filament support included in said cylindrical body and supporting one end of said filament.

2. A Pirani vacuum gauge according to claim 1 in which said pipe is thermally conductive.

3. A Pirani vacuum gauge according to claim 2 in which a temperature sensor is attached onto said pipe whereby a pressure indicating value of said gauge is corrected on the basis of the output of said temperature sensor.

4. A Pirani vacuum gauge according to claim 3 in which said filament is comprised of platinum and said pipe is comprised of stainless.

5. A Pirani vacuum gauge according to claim 3 in which said filament is comprised of platinum and said pipe is comprised of nickel.

6. A Pirani vacuum gauge according to claim 2 in which said filament is comprised of platinum and said pipe is comprised of stainless.

7. A Pirani vacuum gauge according to claim 2 in which said filament is comprised of platinum and said pipe is comprised of nickel.

8. A Pirani vacuum gauge according to claim 1 in which a temperature sensor is attached onto said pipe whereby a pressure indicating value of said gauge is corrected on the basis of the output of said temperature sensor.

9. A Pirani vacuum gauge according to claim 1 in which said filament is comprised of platinum and said pipe is comprised of stainless.

10. A Pirani vacuum gauge according to claim 1 in which said filament is comprised of platinum and said pipe is comprised of nickel.

* * * * *